(12) United States Patent
Trainin et al.

(10) Patent No.: US 10,448,397 B2
(45) Date of Patent: Oct. 15, 2019

(54) CHANNEL BONDING TECHNIQUES FOR WIRELESS NETWORKS

(71) Applicant: INTEL IP CORPORATION, Santa Clara, CA (US)

(72) Inventors: Solomon Trainin, Haifa (IL); Carlos Cordeiro, Portland, OR (US); Assaf Kasher, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 285 days.

(21) Appl. No.: 15/201,445

(22) Filed: Jul. 2, 2016

(65) Prior Publication Data

US 2018/0007692 A1      Jan. 4, 2018

(51) Int. Cl.
*H04W 72/04* (2009.01)
*H04W 24/10* (2009.01)
*H04W 74/00* (2009.01)
*H04W 84/12* (2009.01)
*H04W 74/08* (2009.01)

(52) U.S. Cl.
CPC ....... *H04W 72/0453* (2013.01); *H04W 24/10* (2013.01); *H04W 74/004* (2013.01); *H04W 74/0816* (2013.01); *H04W 84/12* (2013.01)

(58) Field of Classification Search
CPC . H04W 72/0453; H04W 24/10; H04W 72/04; H04W 84/12
See application file for complete search history.

(56) References Cited

U.S. PATENT DOCUMENTS

| 2002/0197998 | A1* | 12/2002 | Schmidt | H04L 5/0005 |
| | | | | 455/452.1 |
| 2014/0071873 | A1* | 3/2014 | Wang | H04W 74/08 |
| | | | | 370/311 |
| 2015/0103713 | A1* | 4/2015 | Lee, II | H04W 52/0235 |
| | | | | 370/311 |
| 2015/0373587 | A1 | 12/2015 | Josiam et al. | |
| 2016/0119069 | A1* | 4/2016 | Mamidwar | H04L 41/0816 |
| | | | | 370/503 |
| 2016/0149683 | A1 | 5/2016 | Huang et al. | |
| 2016/0261319 | A1* | 9/2016 | Sanderovich | H04B 7/0417 |

(Continued)

OTHER PUBLICATIONS

International Search Report received for PCT Patent Application No. PCT/US2017/038683, dated Oct. 18, 2017, 4 pages.

(Continued)

*Primary Examiner* — Kyaw Z Soe

(57) ABSTRACT

Channel bonding techniques for wireless networks are described. In one embodiment, for example, an apparatus may comprise a memory and logic for a wireless communication device, at least a portion of the logic implemented in circuitry coupled to the memory, the logic to generate a channel bonding request frame for transmission to a remote device, the channel bonding request frame to comprise first channel information indicating a plurality of locally-clear wireless channels, the logic to identify, based on second channel information comprised in a received channel bonding response frame, a bonded channel set comprising two or more of the plurality of locally-clear wireless channels, and generate a data frame for transmission to the remote device via a combined bandwidth of the bonded channel set. Other embodiments are described and claimed.

25 Claims, 10 Drawing Sheets

(56) References Cited

U.S. PATENT DOCUMENTS

2016/0316455 A1* 10/2016 Asterjadhi ............ H04W 72/04
2016/0316473 A1* 10/2016 Wang ................ H04W 72/0453
2017/0033958 A1*  2/2017 Eitan .................. H04L 25/0202
2017/0257867 A1*  9/2017 Huang .................. H04L 5/0041

OTHER PUBLICATIONS

Kasher et al., "Channel bonding proposals", IEEE 802.11-16/0098r0, Jan. 18, 2016, 10 pages.

Josiam et al., "Generic Control Frame for 802.11ay", IEEE 802.11-16/0677r1, May 17, 2016, 12 pages.

"Part 11: Wireless LAN Medium Access Control (MAC) and Physical Layer (PHY) Specifications", "Amendment 4: Enhancements for Very High Throughput for Operation in Bands below 6 GHz", IEEE Computer Society, IEEE Std 802.11ac™—2013, 425 pages (author unknown).

* cited by examiner

FIG. 4

Frame 400

| Frame Control | Duration | RA | TA | Fields Presence Bitmap | Primary Channel ID | No. of Secondary Channels Below Primary | FCS |
|---|---|---|---|---|---|---|---|
| 426 | 428 | 430 | 432 | 1 0 1 0 0 0 0 0 <br> 436 | Channel #4 <br> 438 | Two secondary channels below primary <br> 440 | 434 |

CHANNEL BONDING TECHNIQUES FOR WIRELESS NETWORKS

TECHNICAL FIELD

Embodiments described herein generally relate to wireless communications between devices in wireless networks.

BACKGROUND

One factor affecting the data rates that can be realized by devices communicating in a wireless network is the amount of bandwidth that is made available to such devices for use in conjunction with data transmissions. With respect to a given wireless network, a channelization scheme may define a plurality of wireless channels, each of which may comprise a fixed respective sub-band of a frequency band used by that wireless network. In some cases, any given one of such wireless channels may not comprise enough bandwidth to support a data rate that is satisfactory in view of the nature and/or associated requirements of data communications between some devices.

BRIEF DESCRIPTION OF THE DRAWINGS

FIG. 4 illustrates an embodiment of a frame.

DETAILED DESCRIPTION

Figure 1:
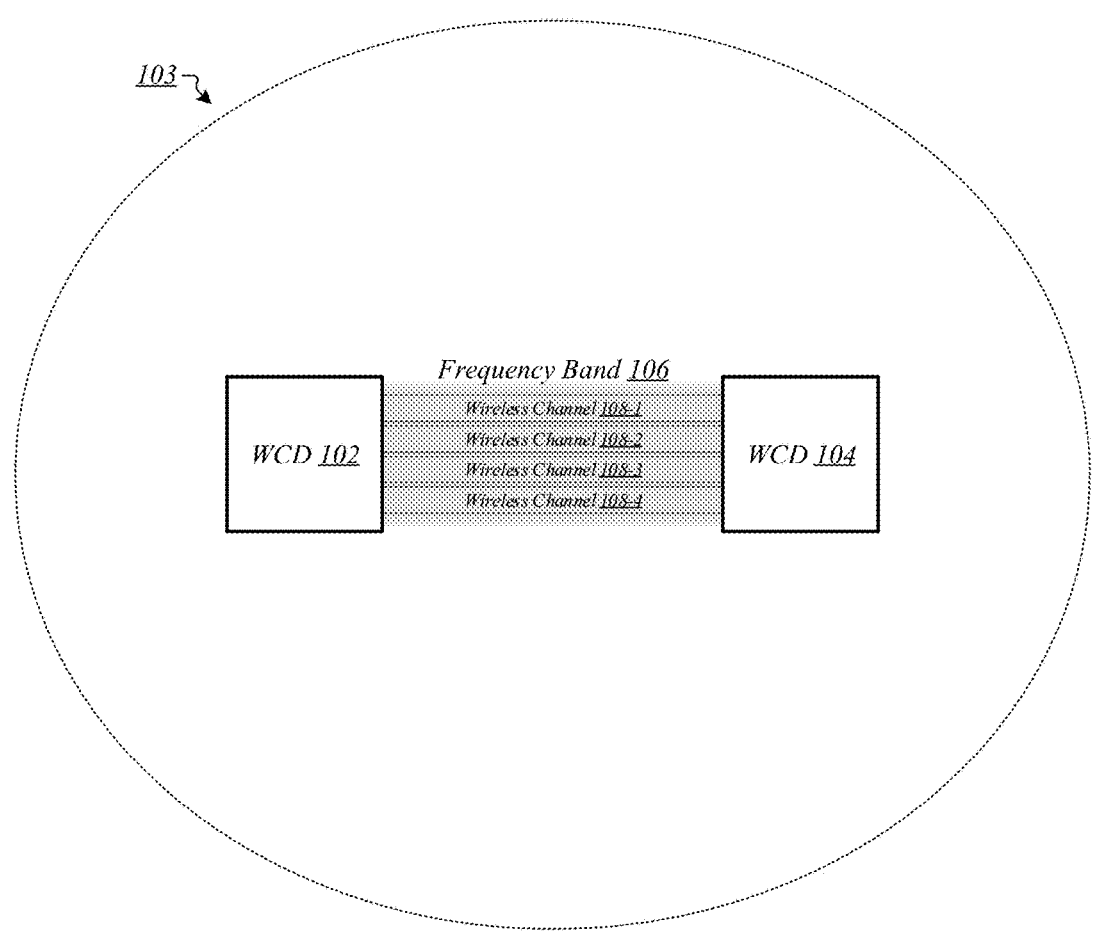
FIG. 1 illustrates an embodiment of a first operating environment.

Various embodiments may be generally directed to channel bonding techniques for wireless networks. In one embodiment, for example, an apparatus may comprise a memory and logic for a wireless communication device, at least a portion of the logic implemented in circuitry coupled to the memory, the logic to generate a channel bonding request frame for transmission to a remote device, the channel bonding request frame to comprise first channel information indicating a plurality of locally-clear wireless channels, the logic to identify, based on second channel information comprised in a received channel bonding response frame, a bonded channel set comprising two or more of the plurality of locally-clear wireless channels, and generate a data frame for transmission to the remote device via a combined bandwidth of the bonded channel set. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments herein are generally directed to wireless communications systems. Some embodiments are particularly directed to wireless communications over 60 GHz frequencies. Various such embodiments may involve wireless communications performed according to one or more standards for 60 GHz wireless communications. For example, some embodiments may involve wireless communications performed according to one or more Wireless Gigabit Alliance ("WiGig")/Institute of Electrical and Electronics Engineers (IEEE) 802.11ad standards, such as IEEE 802.11ad-2012, including their predecessors, revisions, progeny, and/or variants. Various embodiments may involve wireless communications performed according to one or more "next-generation" 60 GHz ("NG60") wireless local area network (WLAN) communications standards, such as the IEEE 802.11ay standard that is currently under development. Some embodiments may involve wireless communications performed according to one or more millimeter-wave (mmWave) wireless communication standards. It is worthy of note that the term "60 GHz," as it is employed in reference to various wireless communications devices, wireless communications frequencies, and wireless communications standards herein, is not intended to specifically denote a frequency of exactly 60 GHz, but rather is intended to generally refer to frequencies in, or near, the 57 GHz to 64 GHz frequency band or any nearby unlicensed band. The embodiments are not limited in this context.

Various embodiments may additionally or alternatively involve wireless communications according to one or more other wireless communication standards. Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Further examples of wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11af, and/or IEEE 802.11ah standards, High-Efficiency Wi-Fi standards developed by the IEEE 802.11 High Efficiency WLAN (HEW) Study Group and/or IEEE 802.11 Task Group (TG) ax, Wi-Fi Alliance (WFA) wireless communication standards such as Wi-Fi, Wi-Fi Direct, Wi-Fi Direct Services, WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

FIG. 1 illustrates an example of an operating environment 100 that may be representative of various embodiments. In operating environment 100, wireless communication devices (WCD) 102 and 104 may wirelessly communicate in a wireless network 103. More particularly, wireless communication devices 102 and 104 may wirelessly communicate via one or more wireless channels of a frequency band 106. In various embodiments, frequency band 106 may comprise a 60 GHz frequency band. In some embodiments, wireless communication devices 102 and 104 may employ directional transmission and reception techniques in conjunction with communicating via one or more wireless channels of frequency band 106. In various embodiments, wireless network 103 may comprise a directional multi-gigabit (DMG) or enhanced DMG (EDMG) network. In some embodiments, wireless communication devices 102 and 104 may operate as DMG stations (STAs) or EDMG STAs. In various embodiments, one of wireless communication devices 102 and 104 may operate as a personal basic service set (PBSS) control point (PCP) or infrastructure basic service set (BSS) access point (AP) for directional wireless network 103, and the other may operate as a non-PCP/AP STA. The embodiments are not limited in this context.

In some embodiments, a channelization scheme for frequency band 106 may define a set of wireless channels, each of which may comprise a respective sub-band within frequency band 106. In the non-limiting example depicted in FIG. 1, four wireless channels—wireless channels 108-1, 108-2, 108-3, and 108-4—are defined within frequency band 106. The maximum rate at which wireless communication devices 102 and 104 can exchange data via any particular one of such wireless channels during any particular time interval may depend on numerous factors. In some cases, depending on such factors and on the amount of data to be exchanged, the throughput that can be achieved using a single one of wireless channels 108-1, 108-2, 108-3, and 108-4 may be sub-optimally low. In various embodiments, in order to enable increased levels of throughput to be realized with respect to inter-device communications in wireless network 103, it may be desirable to implement a channel bonding scheme in wireless network 103. The embodiments are not limited in this context.

Figure 2:
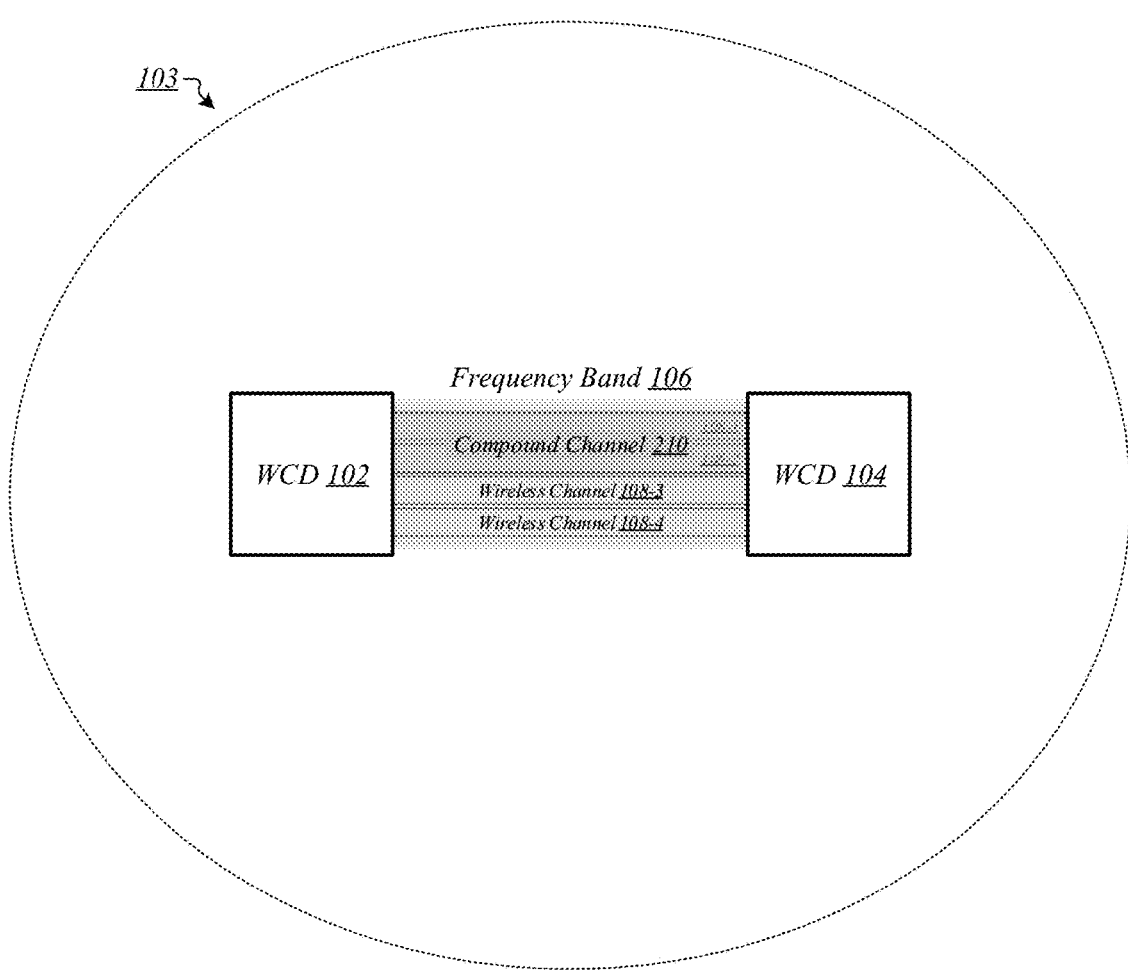
FIG. 2 illustrates an embodiment of a second operating environment.

FIG. 2 illustrates an example of an operating environment 200 that may be representative of the implementation of a channel bonding scheme according to some embodiments. More particularly, operating environment 200 may be representative of various embodiments in which a channel bonding scheme is implemented in wireless network 103 of FIG. 1. In the non-limiting example depicted in FIG. 2, the respective sets of frequency-domain resources of wireless channels 108-1 and 108-2 may both be allocated to a same compound channel 210. In some embodiments, the bandwidth of compound channel 210 may be equal to—or approximately equal to—the sum of the bandwidths of wireless channels 108-1 and 108-2. In various embodiments, wireless channels 108-1 and 108-2 may comprise equal bandwidths, and the bandwidth of compound channel 210 may be equal to—or approximately equal to—twice that of wireless channels 108-1 and 108-2. In some embodiments, by communicating using the larger bandwidth of compound channel 210 rather than the smaller bandwidth of a single one of wireless channels 108-1, 108-2, 108-3, and 108-4, wireless communication devices 102 and 104 may realize higher levels of throughput. The embodiments are not limited in this context.

Disclosed herein are channel bonding techniques that may be implemented in various embodiments in a wireless network such as wireless network 103 in order to enable wireless devices such as wireless communication devices 102 and 104 to communicate via larger bandwidths and realize higher levels of throughput. According to some such techniques, two or more wireless channels may be bonded to form a compound channel, such as compound channel 210. In various embodiments, a wireless communication device may initiate a channel bonding procedure by sending a channel bonding request frame to a second wireless communication device. In some embodiments, the channel bonding request frame may contain information identifying a set of wireless channels that the initiating device has detected as being clear, such as by using clear channel assessment (CCA) procedure. In various embodiments, the device receiving the channel bonding request frame may respond by sending a channel bonding response frame containing information identifying, among the set of wireless channels identified in the channel bonding request frame, the wireless channels that it also detects as being clear. In some embodiments, following the exchange of the channel bonding request and channel bonding response frames, the two devices may engage in a request-to-send (RTS)/clear-to-send (CTS) exchange. In various embodiments, the RTS/CTS exchange may involve an exchange of legacy RTS and CTS frames over the channels identified in the channel bonding response frame. In some embodiments, the RTS/CTS exchange may serve to notify legacy devices—which may not be capable of understanding the channel bonding request and channel bonding response frames—of the forthcoming unavailability of the channels to be bonded and the duration of that unavailability. The embodiments are not limited in this context.

Figure 3:
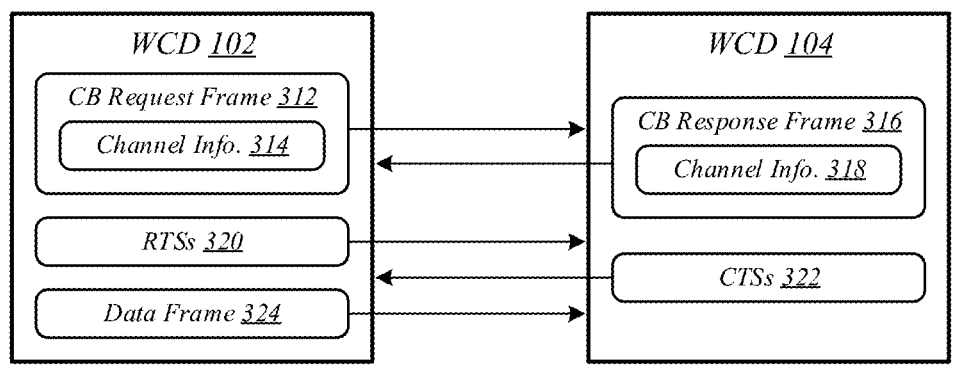
FIG. 3 illustrates an embodiment of a third operating environment.

FIG. 3 illustrates an operating environment 300 that may be representative of the implementation of one or more of the disclosed channel bonding techniques according to various embodiments. In operating environment 300, wireless communication device 102 may initiate a channel bonding procedure by sending a channel bonding request frame 312 to wireless communication device 104. In some embodiments, channel bonding request frame 312 may comprise a medium access control (MAC) frame. In various embodiments, channel bonding request frame 312 may comprise a MAC frame of a Control frame type (a MAC Control frame). In some embodiments, channel bonding request frame 312 may comprise a MAC Control frame of a Control Frame Extension subtype. In various embodiments, channel bonding request frame 312 may comprise a Frame Control field within which a Type field is set to a value indicating that channel bonding request frame 312 is a Control frame, a Subtype field is set to a value indicating that channel bonding request frame 312 is a Control frame of the Control Frame Extension subtype, and a Control Frame Extension field is set to a value indicating a channel bonding request frame. In some such embodiments, the value of the Control Frame Extension field may constitute a reserved value according to a legacy protocol. The embodiments are not limited in this context.

In various embodiments, channel bonding request frame 312 may comprise channel information 314. Channel information 314 may generally comprise information identifying a set of locally-clear wireless channels, each of which may comprise a wireless channel that wireless communication device 102 has detected as being clear. In some embodiments, before transmitting channel bonding request frame 312, wireless communication device 102 may use a CCA procedure to identify a set of locally-clear wireless channels. In such embodiments, wireless communication device 102 may then include, in channel bonding request frame 312, channel information 314 that identifies the set of wireless channels that it determined to be locally-clear using the CCA procedure. In various embodiments, wireless communication device 102 may transmit channel bonding request frame 312 over each of the wireless channels indicated by channel information 314. In various embodiments, channel bonding request frame 312 may be used to convey additional information not depicted in FIG. 3. In some embodiments, for example, channel bonding request frame 312 may additionally comprise associated identifiers (AIDs) of destination STAs for a multi-user multiple-input multiple output (MU-MIMO) transmission. In another example, in various embodiments, channel bonding request frame 312 may comprise link measurements for use in conjunction with fast link adaptation. The embodiments are not limited to these examples.

In some embodiments, upon receipt of channel bonding request frame 312, wireless communication device 104 may identify a set of mutually-clear wireless channels, each of which may comprise a wireless channel that both wireless communication device 102 and wireless communication device 104 have detected as being clear. In various embodiments, wireless communication device 104 may identify the set of mutually-clear wireless channels by determining which of the wireless channels indicated by channel information 314 are clear at the location of wireless communication device 104. In some embodiments, the set of mutually-clear wireless channels may include, from among the wireless channels indicated by channel information 314, each wireless channel that wireless communication device 104 detects as being clear. In various embodiments, with respect to each channel indicated by channel information 314, wireless communication device 104 may base its determination of whether that channel is locally-clear on a CCA for that channel. In some embodiments, following receipt of channel bonding request frame 312, wireless communication device 104 may perform a CCA for each wireless channel indicated by channel information 314 in order to determine whether each such channel is locally-clear. In various other embodiments, with respect to some or all of the wireless channels indicated by channel information 314, wireless communication device 104 may base such determinations on the results of CCAs performed prior to receipt of channel bonding request frame 312. The embodiments are not limited in this context.

In some embodiments, wireless communication device 104 may send a channel bonding response frame 316 to wireless communication device 102 in response to channel bonding request frame 312. In various embodiments, wireless communication device 102 may set a Duration field of channel bonding request frame 312 to a value selected to cause third-party devices to refrain from transmitting over the channels indicated by channel information 314 for a sufficient amount of time to maintain availability of those channels for use by wireless communication device 104 to transmit channel bonding response frame 316. In some embodiments, channel bonding response frame 316 may comprise channel information 318 indicating the set of mutually-clear wireless channels that wireless communication device 104 has identified. In various embodiments, wireless communication device 104 may transmit channel bonding response frame 316 over each of the wireless channels indicated by channel information 318. The embodiments are not limited in this context.

In some embodiments, channel bonding response frame 316 may comprise a MAC frame. In various embodiments, channel bonding response frame 316 may comprise a MAC Control frame. In some embodiments, channel bonding response frame 316 may comprise a MAC Control frame of a Control Frame Extension subtype. In various embodiments, channel bonding response frame 316 may comprise a Frame Control field within which a Type field is set to a value indicating that channel bonding response frame 316 is a Control frame, a Subtype field is set to a value indicating that channel bonding response frame 316 is a Control frame of the Control Frame Extension subtype, and a Control Frame Extension field is set to a value indicating a channel bonding response frame. In some such embodiments, the value of the Control Frame Extension field may constitute a reserved value according to a legacy protocol. In various embodiments, channel bonding response frame 316 may be used to convey additional information not depicted in FIG. 3. In some embodiments, for example, channel bonding response frame 316 may additionally comprise link measurements for use in conjunction with fast link adaptation. The embodiments are not limited to this example.

In various embodiments, upon receipt of channel bonding response frame 316, wireless communication device 102 may identify two or more wireless channels to be bonded for a data transmission from wireless communication device 102 to wireless communication device 104. The term "bonded channel set" may be employed to denote such a set of two or more wireless channels that are to be bonded. In some embodiments, wireless communication device 102 may identify each wireless channel indicated by channel information 318 as a wireless channel to be included in a bonded channel set for the data transmission. In various other embodiments, the bonded channel set that wireless communication device 102 identifies may comprise a subset of the set of wireless channels indicated by channel information 318. The embodiments are not limited in this context.

In some embodiments, once it has identified the bonded channel set, wireless communication device 102 may initiate an RTS/CTS exchange with wireless communication device 104. In various embodiments, wireless communication device 102 may initiate the RTS/CTS exchange by transmitting an RTS 320 over each wireless channel in the bonded channel set. In various embodiments, wireless communication device 104 may set a Duration field of channel bonding response frame 316 to a value selected to cause third-party devices to refrain from transmitting over the channels indicated by channel information 318 for a sufficient amount of time to maintain availability of those channels for use by wireless communication device 102 to transmit RTS 320. The embodiments are not limited in this context.

In some embodiments, wireless communication device 104 may respond by transmitting a CTS 322 over each wireless channel in the bonded channel set. In some embodiments, wireless communication device 102 may set a Duration field of RTS 320 to a value selected to cause third-party devices to refrain from transmitting over the channels of the bonded channel set for a sufficient amount of time to maintain availability of those channels for use by wireless communication device 104 to transmit CTS 322. In various embodiments, RTS 320 and CTS 322 may comprise frames of a type that can be properly understood/processed by legacy devices that are not able to properly understand/process channel bonding request frame 312 and channel bonding response frame 316. In some embodiments, RTS 320 may comprise an RTS frame as defined by the IEEE 802.11-2012 standard published on Mar. 29, 2012 (hereinafter, "IEEE 802.11-2012") and the IEEE 802.11ad-2012 standard published on Dec. 28, 2012 (hereinafter, "IEEE 802.11ad-2012"). In various embodiments, CTS 322 may comprise a DMG CTS frame as defined by IEEE 802.11-2012 and IEEE 802.11ad-2012. The embodiments are not limited in this context.

In some embodiments, following the RTS/CTS exchange with wireless communication device 104, wireless communication device 102 may generate a data frame 324 for transmission to wireless communication device 104 via the combined bandwidth of the two or more wireless channels to be bonded. The term "bonded-channel transmission" may be employed to denote a transmission that utilizes the collective bandwidth of a bonded set of wireless channels. Accordingly, transmission of data frame 324 to wireless communication device 104 via the combined bandwidth of the two or more wireless channels indicated by channel information 318 may be described as a bonded-channel transmission of data frame 324. In various embodiments, wireless communication device 104 may set a Duration field of CTS 322 to a value selected to cause third-party devices to refrain from transmitting over the channels of the bonded channel set for a sufficient amount of time to maintain availability of those channels for use by wireless communication device 102 for bonded-channel transmission of data frame 324. The embodiments are not limited in this context.

FIG. 4 illustrates an example of a frame 400 that may be representative of a frame that may be used in conjunction with the implementation of one or more of the disclosed channel bonding techniques according to some embodiments. For example, the format of frame 400 may be representative of a format of one or both of channel bonding request frame 312 and channel bonding response frame 316 of FIG. 3 according to various embodiments. As shown in FIG. 4, frame 400 comprises a Frame Control field 426, a Duration field 428, a receiver address (RA) field 430, a transmitter address (TA) field 432, and a frame check sequence (FCS) field 434. Frame 400 also comprises a Fields Presence Bitmap field 436. Fields Presence Bitmap field 436 may generally comprise a field containing a bitmap that indicates which—if any—of a set of optional fields are included within frame 400. In the non-limiting example depicted in FIG. 4, Fields Presence Bitmap field 436 contains an 8-bit bitmap, each bit of which may indicate the presence or absence of a respective optional field according to a predefined scheme.

In this example, the first bit of Fields Presence Bitmap field 436 may be designated for use to indicate the presence or absence of a Primary Channel ID field 438, and since primary channel ID field 438 is present within frame 400, the first bit of Fields Presence Bitmap field 436 may be set to 1. Likewise, the third bit of Fields Presence Bitmap field 436 may be set to 1 to indicate presence of a Number of Secondary Channels Below Primary field 440. In some embodiments, Primary Channel ID field 438 and Number of Secondary Channels Below Primary field 440 may comprise 1-byte fields. In various embodiments, Primary Channel ID field 438 may comprise a value identifying a wireless channel that constitutes a primary channel with respect to a bonded-channel transmission. In the example of FIG. 4, Primary Channel ID field 438 indicates that a channel #4 constitutes the primary channel. In some embodiments, Number of Secondary Channels Below Primary field 440 may comprise a value indicating a number of secondary channels below the primary channel that are to be used along with the primary channel for the bonded-channel transmission. In the example of FIG. 4, Number of Secondary Channels Below Primary field 440 comprises a value indicating that two secondary channels below the primary channel are to be used along with the primary channel. The embodiments are not limited to these examples.

The remaining bits of Fields Presence Bitmap field 436 may correspond to other optional fields, and may be set to 0 in this example due to the absence of any such other optional fields from frame 400. Examples of optional fields that may be defined for potential inclusion in a frame such as frame 400 in various embodiments may include fields comprising associated identifiers (AIDs) of destination STAs of multi-user multiple-input multiple output (MU-MIMO) transmissions and fields comprising link measurements to support fast link adaptation. The embodiments are not limited to these examples.

Returning to operating environment 300 of FIG. 3, in various embodiments, channel bonding request frame 312 may feature a same or similar format as frame 400 of FIG. 4. In some such embodiments, channel information 314 may be comprised in one or more optional fields that are included in channel bonding request frame 312, and the presence of those fields may be indicated by setting values of appropriate bits in a bitmap according to a defined scheme. For instance, in the context of the example of FIG. 4, channel information 314 may comprise the values contained in Primary Channel ID field 438 and Number of Secondary Channels Below Primary field 440, and the presence of those fields may be indicated by setting the first and third bits to 1 in the bitmap contained in Fields Presence Bitmap field 436. Likewise, in various embodiments, channel bonding response frame 316 may feature a same or similar format as frame 400 of FIG. 4. In some such embodiments, channel information 318 may be comprised in one or more optional fields that are included in channel bonding response frame 316, and the presence of those fields may be indicated by setting values of appropriate bits in a bitmap according to a same defined scheme as that associated with the bitmap in channel bonding request frame 312. The embodiments are not limited in this context.

It is worthy of note that in various embodiments, the optional field(s) included in channel bonding response frame 316 may differ from the optional field(s) included in channel bonding request frame 312. Additionally, in some embodiments, one of channel bonding request frame 312 and channel bonding response frame 316 may not include any optional fields, while the other may include one or more optional fields. Furthermore, in various embodiments, neither channel bonding request frame 312 or channel bonding response frame 316 may include any optional fields. The embodiments are not limited in this context.

Figure 5:
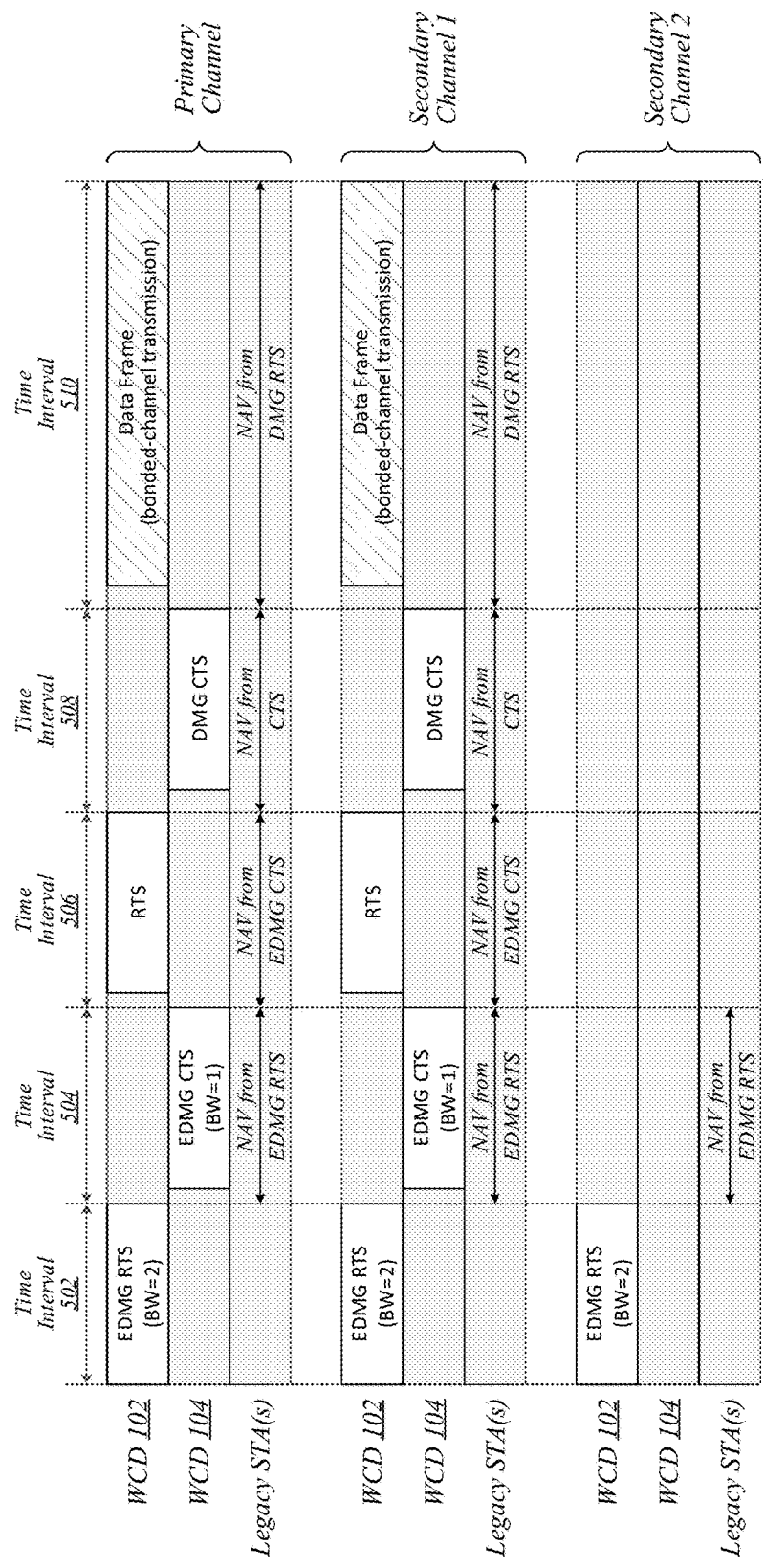
FIG. 5 illustrates an embodiment of a communications flow.

FIG. 5 illustrates an example of a communications flow 500 that may be representative of the implementation of one or more of the disclosed channel bonding techniques according to some embodiments. For example, communications flow 500 may be representative of various embodiments in which, in operating environment 300 of FIG. 3, channel bonding request frame 312 comprises an EDMG RTS frame, channel bonding response frame 316 comprises an EDMG CTS frame, RTS 320 comprises an RTS frame as defined by IEEE 802.11-2012 and IEEE 802.11ad-2012, and CTS 322 comprises a DMG CTS frame as defined by IEEE 802.11-2012 and IEEE 802.11ad-2012.

According to communications flow 500, following a determination that a primary channel, a secondary channel 1, and a secondary channel 2 are each locally-clear, wireless communication device 102 may transmit an EDMG RTS frame over each of those channels during a time interval 502. The EDMG RTS frame may comprise information—such as channel information 314—that identifies the primary channel, secondary channel 1, and secondary channel 2 as channels that wireless communication device 102 has detected as being clear. A value of a Duration field of the EDMG RTS frame may be set such that—with respect to each such channel—legacy STA(s) configured to utilize that channel for wireless communications will assert network allocation vectors (NAVs) that cause them to refrain from transmitting over that channel during a subsequent time interval 504.

Following receipt of the EDMG RTS frame from wireless communication device 102, wireless communication device 104 may determine that the primary channel and secondary channel 1 are locally-clear, but that secondary channel 2 is not. Based on this determination, wireless communication device 104 may transmit an EDMG CTS frame over the primary channel and secondary channel 1 during time interval 504. The EDMG CTS frame may comprise information—such as channel information 318—that identifies the primary channel and secondary channel 1 as channels that wireless communication device 104 has detected as being clear. A value of a Duration field of the EDMG CTS frame may be set such that—with respect to both the primary channel and secondary channel 1—legacy STA(s) configured to utilize that channel for wireless communications will assert network allocation vectors (NAVs) that cause them to refrain from transmitting over that channel during a subsequent time interval 506. As the EDMG CTS frame is not transmitted over secondary channel 2, secondary channel 2 may become available for use by legacy STA(s) upon the expiration of NAVs set based on the EDMG RTS frame transmitted over secondary channel 2 by wireless communication device 102. As such, secondary channel 2 may be available for use by legacy STA(s) during time interval 506.

In response to receipt of the EDMG CTS frame from wireless communication device 104, wireless communication device 102 may identify the primary channel and secondary channel 1 as the channels that are to make up the bonded channel set for a bonded-channel data transmission to wireless communication device 104. Wireless communication device 102 may then transmit an RTS frame over the primary channel and secondary channel 1. A value of a Duration field of the RTS frame may be set such that—with respect to both the primary channel and secondary channel 1—legacy STA(s) configured to utilize that channel for wireless communications will assert network allocation vectors (NAVs) that cause them to refrain from transmitting over that channel during a subsequent time interval 508. As the RTS frame is not transmitted over secondary channel 2, secondary channel 2 may remain available for use by legacy STA(s) during time interval 508.

Following receipt of the RTS frame from wireless communication device 102, wireless communication device 104 may transmit a DMG CTS frame over the primary channel and secondary channel 1. A value of a Duration field of the DMG CTS frame may be set such that—with respect to both the primary channel and secondary channel 1—legacy STA(s) configured to utilize that channel for wireless communications will assert network allocation vectors (NAVs) that cause them to refrain from transmitting over that channel during a subsequent time interval 510. As the DMG CTS frame is not transmitted over secondary channel 2, secondary channel 2 may remain available for use by legacy STA(s) during time interval 510. During time interval 510, wireless communication device 102 may transmit a data frame to wireless communication device 104, using the combined bandwidth of the primary channel and secondary channel 1. The embodiments are not limited to this example.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
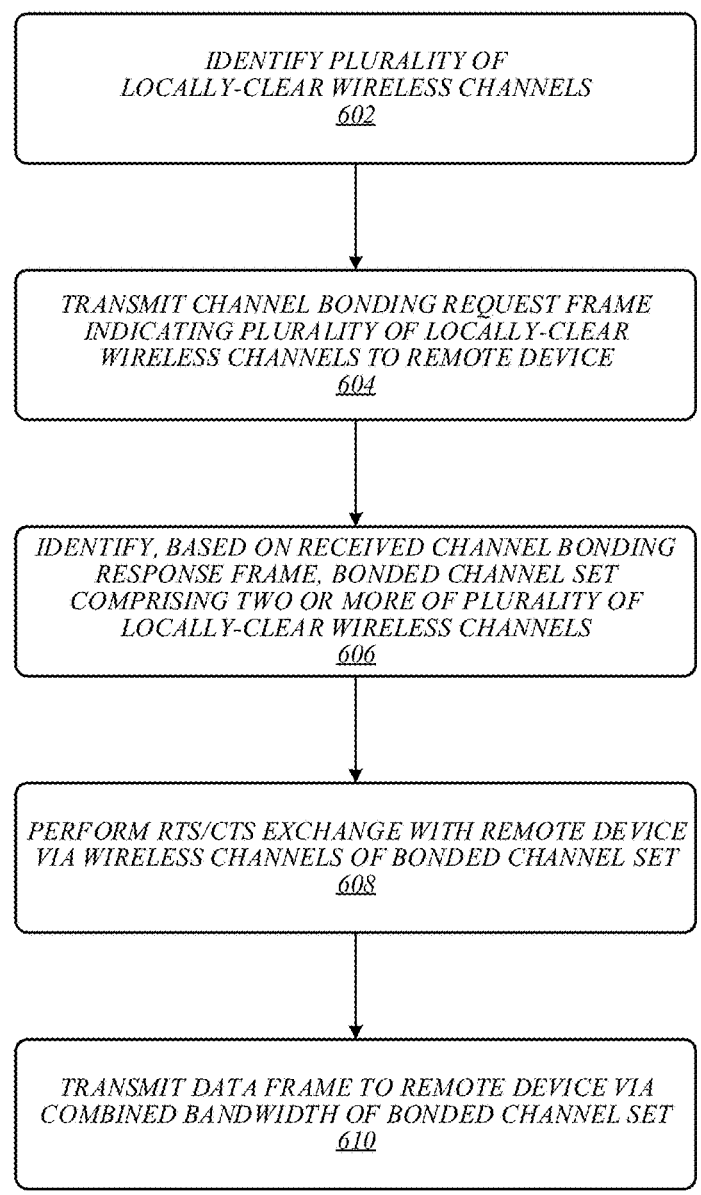
FIG. 6 illustrates an embodiment of a first logic flow.

FIG. 6 illustrates an example of a logic flow 600 that may be representative of the implementation of one or more of the disclosed channel bonding techniques according to some embodiments. For example, logic flow 600 may be representative of operations that may be performed in various embodiments by wireless communication device 102 in operating environment 300 of FIG. 3 and/or in conjunction with communications flow 500 of FIG. 5. As shown in FIG. 6, a plurality of locally-clear wireless channels may be identified at 602. For example, in operating environment 300 of FIG. 3, wireless communication device 102 may be operative to use a CCA procedure to identify a plurality of locally-clear wireless channels. At 604, a channel bonding request frame that indicates the plurality of locally-clear wireless channels may be transmitted to a remote device. For example, in operating environment 300 of FIG. 3, wireless communication device 102 may be operative to transmit channel bonding request frame 312 to wireless communication device 104, and channel bonding request frame 312 may comprise channel information 314 that indicates a plurality of wireless channels that wireless communication device 102 has detected as being clear.

At 606, a bonded channel set may be identified based on a received channel bonding response frame, and may comprise two or more of the plurality of locally-clear wireless channels identified at 602. For example, in operating environment 300 of FIG. 3, wireless communication device 102 may be operative to identify a bonded channel set based on channel information 318 comprised in a channel bonding response frame 316 received from wireless communication device 104, and the bonded channel set may comprise two or more of the plurality of wireless channels sensed as being free by wireless communication device 102. At 608, an RTS/CTS exchange with the remote device may be performed via the wireless channels of the bonded channel set. For example, in operating environment 300 of FIG. 3, wireless communication device 102 may be operative to send RTSs 320 to wireless communication device 104 via the wireless channels of the bonded channel set and receive CTSs 322 from wireless communication device 104 via the wireless channels of the bonded channel set. At 610, a data frame may be transmitted to the remote device via a combined bandwidth of the bonded channel set. For example, in operating environment 300 of FIG. 3, wireless communication device 102 may be operative to transmit data frame 324 to wireless communication device 104 via a combined bandwidth of the bonded channel set. The embodiments are not limited to these examples.

Figure 7:
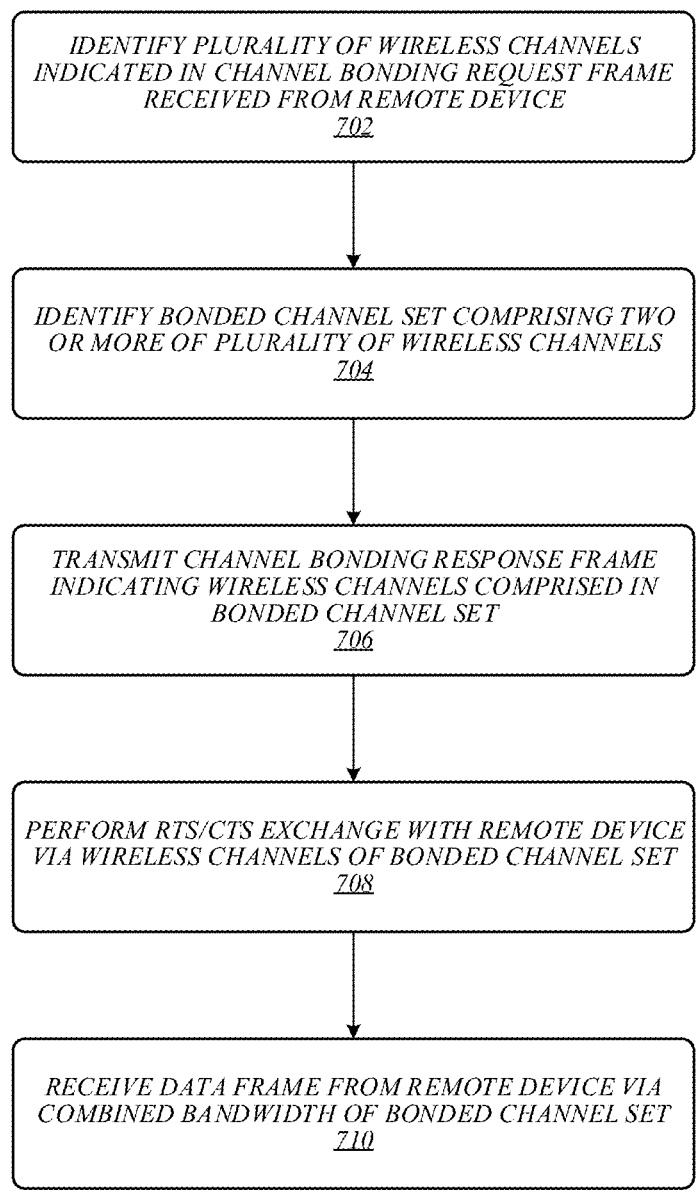
FIG. 7 illustrates an embodiment of a second logic flow.

FIG. 7 illustrates an example of a logic flow 700 that may be representative of the implementation of one or more of the disclosed channel bonding techniques according to some embodiments. For example, logic flow 700 may be representative of operations that may be performed in various embodiments by wireless communication device 104 in operating environment 300 of FIG. 3 and/or in conjunction with communications flow 500 of FIG. 5. As shown in FIG. 7, a plurality of wireless channels indicated in a channel bonding request frame received from a remote device may be identified at 702. For example, in operating environment 300 of FIG. 3, wireless communication device 104 may be operative to identify a plurality of wireless channels indicated by channel information 318 comprised in a channel bonding request frame 312 received from wireless communication device 102. At 704, a bonded channel set may be identified that comprises two or more of the plurality of wireless channels indicated in the received channel bonding request frame. For example, in operating environment 300 of FIG. 3, wireless communication device 104 may be operative to identify a bonded channel set that comprises, from among a plurality of wireless channels indicated in channel bonding request frame 312, two or more wireless channels that wireless communication device 104 senses as being free.

At 706, a channel bonding response frame may be transmitted that indicates the wireless channels comprised in the bonded channel set identified at 704. For example, in operating environment 300 of FIG. 3, wireless communication device 104 may be operative to transmit channel bonding response frame 316, which may comprise channel information 318 that indicates the wireless channels comprised in a bonded channel set identified at 704. At 708, an RTS/CTS exchange with the remote device may be performed via the wireless channels of the bonded channel set. For example, in operating environment 300 of FIG. 3, wireless communication device 104 may be operative to receive RTSs 320 from wireless communication device 102 via the wireless channels of the bonded channel set and transmit CTSs 322 to wireless communication device 102 via the wireless channels of the bonded channel set. At 710, a data frame may be received from the remote device via a combined bandwidth of the bonded channel set. For example, in operating environment 300 of FIG. 3, wireless communication device 104 may be operative to receive data frame 324 from wireless communication device 102 via a combined bandwidth of the bonded channel set. The embodiments are not limited to these examples.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc. The embodiments are not limited in this context.

Figure 8:
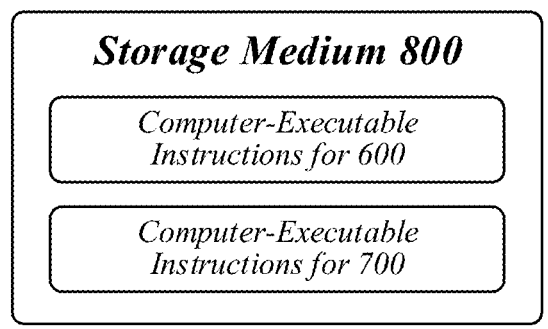
FIG. 8 illustrates an embodiment of a storage medium.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement one or both of logic flow 600 of FIG. 6 and logic flow 700 of FIG. 7. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
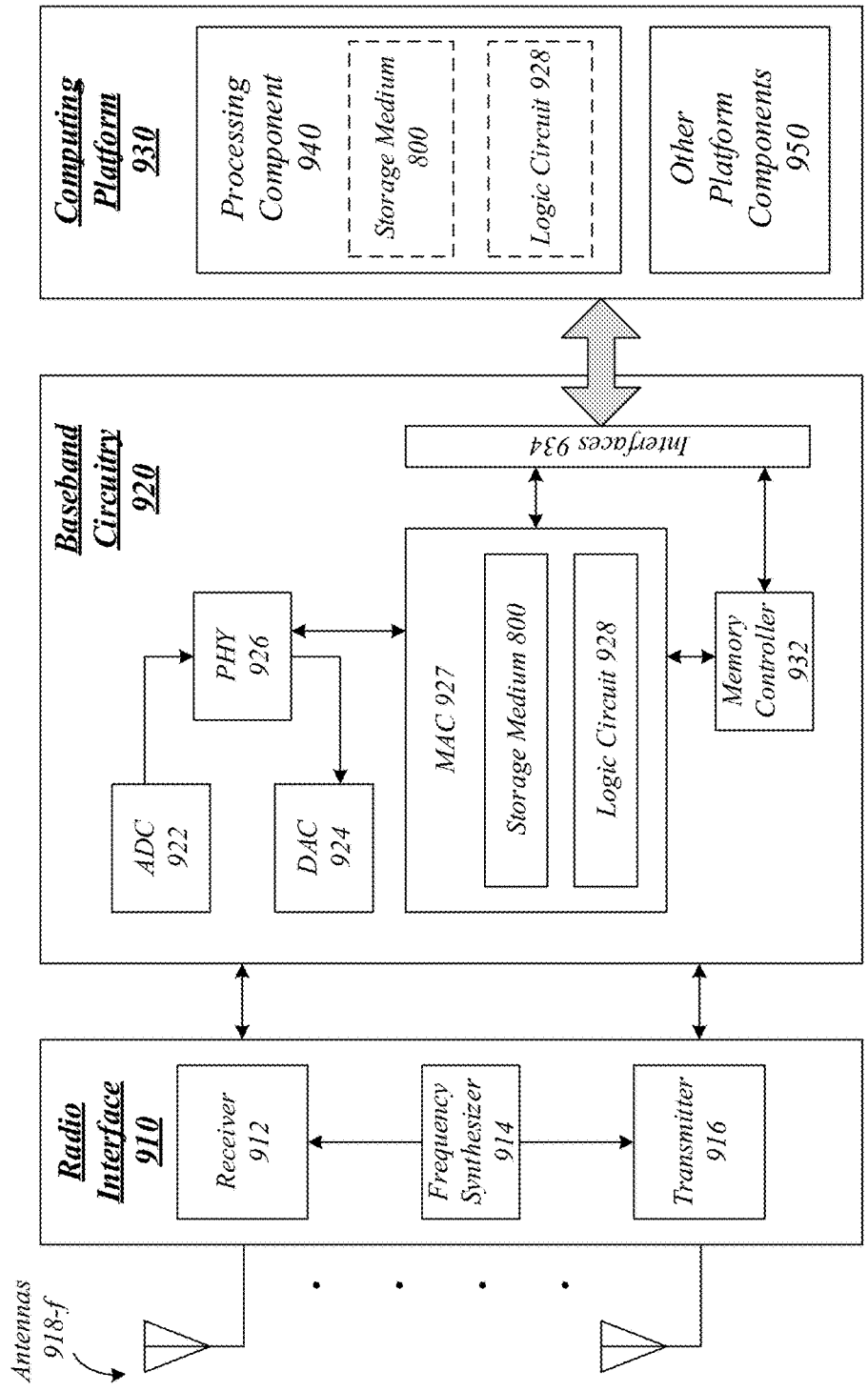
FIG. 9 illustrates an embodiment of a device.

FIG. 9 illustrates an embodiment of a communications device 900 that may implement one or more of wireless communication device 102, wireless communication device 104, logic flow 600, logic flow 700, and storage medium 800. In various embodiments, device 900 may comprise a logic circuit 928. The logic circuit 928 may include physical circuits to perform operations described for one or more of wireless communication device 102, wireless communication device 104, logic flow 600, and logic flow 700, for example. As shown in FIG. 9, device 900 may include a radio interface 910, baseband circuitry 920, and computing platform 930, although the embodiments are not limited to this configuration.

The device 900 may implement some or all of the structure and/or operations for one or more of wireless communication device 102, wireless communication device 104, logic flow 600, logic flow 700, storage medium 800, and logic circuit 928 in a single computing entity, such as entirely within a single device. Alternatively, the device 900 may distribute portions of the structure and/or operations for one or more of wireless communication device 102, wireless communication device 104, logic flow 600, logic flow 700, storage medium 800, and logic circuit 928 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 910 may include, for example, a receiver 912, a frequency synthesizer 914, and/or a transmitter 916. Radio interface 910 may include bias controls, a crystal oscillator and/or one or more antennas 918-f. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 926 for PHY link layer processing of respective receive/transmit signals. Baseband circuitry 920 may include, for example, a medium access control (MAC) processing circuit 927 for MAC/data link layer processing. Baseband circuitry 920 may include a memory controller 932 for communicating with MAC processing circuit 927 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames. Alternatively or in addition, MAC processing circuit 927 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for one or more of wireless communication device 102, wireless communication device 104, logic flow 600, logic flow 700, storage medium 800, and logic circuit 928 using the processing component 940. The processing component 940 (and/or PHY 926 and/or MAC 927) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired.

Embodiments of device 900 may be implemented using single input single output (SISO) architectures. However, certain implementations may include multiple antennas (e.g., antennas 918-f) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 10:
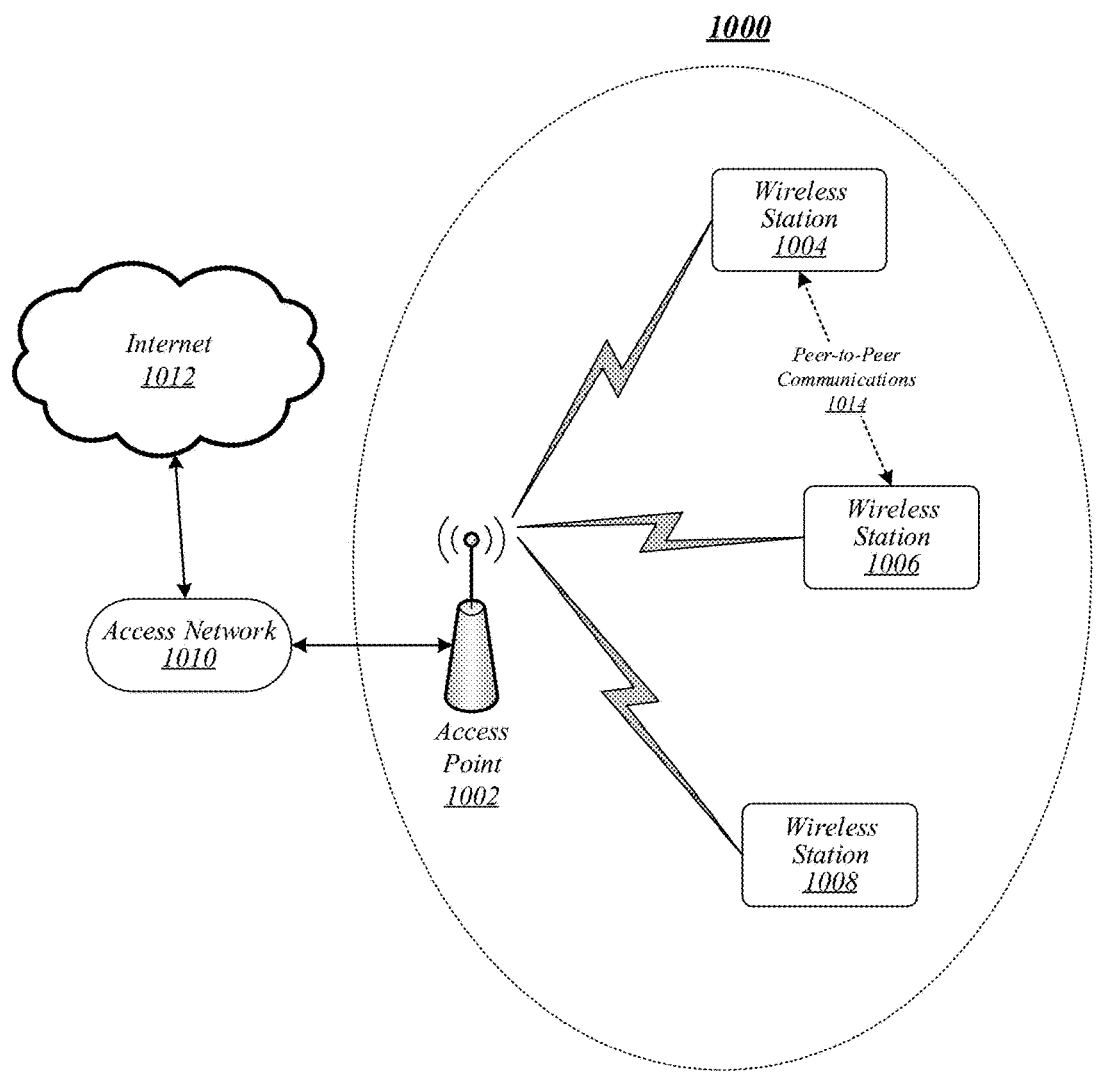
FIG. 10 illustrates an embodiment of a wireless network.

FIG. 10 illustrates an embodiment of a wireless network 1000. As shown in FIG. 10, wireless network comprises an access point 1002 and wireless stations 1004, 1006, and 1008. In various embodiments, wireless network 1000 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1000 may comprise another type of wireless network, and/or may implement other wireless communications standards. In various embodiments, for example, wireless network 1000 may comprise a WWAN or WPAN rather than a WLAN. The embodiments are not limited to this example.

In some embodiments, wireless network 1000 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1004, 1006, and 1008 may communicate with access point 1002 in order to obtain connectivity to one or more external data networks. In some embodiments, for example, wireless stations 1004, 1006, and 1008 may connect to the Internet 1012 via access point 1002 and access network 1010. In various embodiments, access network 1010 may comprise a private network that provides subscription-based Internet-connectivity, such as an Internet Service Provider (ISP) network. The embodiments are not limited to this example.

In various embodiments, two or more of wireless stations 1004, 1006, and 1008 may communicate with each other directly by exchanging peer-to-peer communications. For example, in the example of FIG. 10, wireless stations 1004 and 1006 communicate with each other directly by exchanging peer-to-peer communications 1014. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising a memory, and logic for a wireless communication device, at least a portion of the logic implemented in circuitry coupled to the memory, the logic to generate a channel bonding request frame for transmission to a remote device, the channel bonding request frame to comprise first channel information indicating a plurality of locally-clear wireless channels, the logic to identify, based on second channel information comprised in a received channel bonding response frame, a bonded channel set comprising two or more of the plurality of locally-clear wireless channels, and generate a data frame for transmission to the remote device via a combined bandwidth of the bonded channel set.

Example 2 is the apparatus of Example 1, the logic to identify the plurality of locally-clear wireless channels using a clear channel assessment (CCA) procedure.

Example 3 is the apparatus of any of Examples 1 to 2, the logic to generate a request-to-send (RTS) frame for transmission over each wireless channel of the bonded channel set prior to an initiation of a transmission of the data frame.

Example 4 is the apparatus of any of Examples 1 to 3, the logic to initiate a transmission of the data frame following a receipt of a clear-to-send (CTS) frame from the remote device.

Example 5 is the apparatus of Example 4, the CTS frame to comprise a directional multi-gigabit (DMG) CTS frame.

Example 6 is the apparatus of any of Examples 1 to 5, the channel bonding request and channel bonding response frames to comprise medium access control (MAC) Control frames.

Example 7 is the apparatus of Example 6, the channel bonding request and channel bonding response frames to comprise MAC Control frames of a Control Frame Extension subtype.

Example 8 is the apparatus of any of Examples 1 to 7, the first channel information to be comprised in one or more optional fields present in the channel bonding request frame.

Example 9 is the apparatus of Example 8, the channel bonding request frame to contain a bitmap including one or more bits set to indicate the presence of the one or more optional fields comprising the first channel information.

Example 10 is the apparatus of Example 9, the bitmap to comprise an 8-bit bitmap.

Example 11 is the apparatus of any of Examples 1 to 10, the second channel information to be comprised in one or more optional fields present in the channel bonding response frame.

Example 12 is the apparatus of Example 11, the channel bonding response frame to contain a bitmap including one or more bits set to indicate the presence of the one or more optional fields comprising the second channel information.

Example 13 is the apparatus of Example 12, the bitmap to comprise an 8-bit bitmap.

Example 14 is the apparatus of any of Examples 1 to 13, the channel bonding request frame to include a Duration field comprising a value selected to maintain an availability of each of the plurality of locally-clear wireless channels during a transmission of the channel bonding response frame.

Example 15 is the apparatus of any of Examples 1 to 14, the channel bonding request frame to comprise one or more link measurements.

Example 16 is the apparatus of Example 15, the one or more link measurements to be comprised in one or more optional fields present in the channel bonding request frame.

Example 17 is the apparatus of any of Examples 1 to 16, the channel bonding request frame to comprise one or more association identifiers (AIDs) associated with destination stations (STAs) of a multi-user multiple-input multiple-output (MU-MIMO) transmission.

Example 18 is the apparatus of Example 17, the one or more AIDs to be comprised in one or more optional fields present in the channel bonding request frame.

Example 19 is the apparatus of any of Examples 1 to 18, the channel bonding response frame to comprise one or more link measurements.

Example 20 is the apparatus of Example 19, the one or more link measurements to be comprised in one or more optional fields present in the channel bonding response frame.

Example 21 is the apparatus of any of Examples 1 to 20, the plurality of locally-clear wireless channels to comprise wireless channels of a 60 GHz frequency band.

Example 22 is the apparatus of any of Examples 1 to 21, the logic to cause the wireless communication device to operate as an enhanced directional multi-gigabit (EDMG) station (STA).

Example 23 is the apparatus of Example 22, the logic to cause the wireless communication device to operate as a personal basic service set (PBSS) control point (PCP) or access point (AP), the remote device to comprise a non-PCP/AP EDMG STA.

Example 24 is the apparatus of Example 22, the remote device to comprise a personal basic service set (PBSS) control point (PCP) or access point (AP), the logic to cause the wireless communication device to operate as a non-PCP/AP EDMG STA.

Example 25 is a system, comprising an apparatus according to any of Examples 1 to 24, and at least one radio frequency (RF) transceiver.

Example 26 is the system of Example 25, comprising at least one processor.

Example 27 is the system of any of Examples 25 to 26, comprising at least one RF antenna.

Example 28 is an apparatus, comprising a memory, and logic for a wireless communication device, at least a portion of the logic implemented in circuitry coupled to the memory, the logic to identify a bonded channel set comprising two or more locally-clear wireless channels among a plurality of wireless channels indicated by first channel information comprised in a channel bonding request frame received from a remote device and generate a channel bonding response frame for transmission to the remote device, the channel bonding response frame to comprise second channel information indicating the two or more locally-clear wireless channels comprised in the bonded channel set, the logic to decode a data frame received from the remote device via a combined bandwidth of the bonded channel set.

Example 29 is the apparatus of Example 28, the logic to identify the two or more locally-clear wireless channels using a clear channel assessment (CCA) procedure.

Example 30 is the apparatus of any of Examples 28 to 29, the logic to generate a clear-to-send (CTS) frame for transmission over each wireless channel of the bonded channel set prior to receipt of the data frame.

Example 31 is the apparatus of Example 30, the CTS frame to include a Duration field comprising a value selected to maintain an availability of each wireless channel of the bonded channel set during a transmission of the data frame.

Example 32 is the apparatus of any of Examples 30 to 31, the logic to initiate transmission of the CTS frame over each wireless channel of the bonded channel set in response to a receipt of a request-to-send (RTS) frame from the remote device.

Example 33 is the apparatus of Example 32, the channel bonding response frame to include a Duration field comprising a value selected to maintain an availability of each wireless channel of the bonded channel set during a transmission of the RTS frame.

Example 34 is the apparatus of any of Examples 30 to 33, the CTS frame to comprise a directional multi-gigabit (DMG) CTS frame.

Example 35 is the apparatus of any of Examples 28 to 34, the channel bonding request and channel bonding response frames to comprise medium access control (MAC) Control frames.

Example 36 is the apparatus of Example 35, the channel bonding request and channel bonding response frames to comprise MAC Control frames of a Control Frame Extension subtype.

Example 37 is the apparatus of any of Examples 28 to 36, the first channel information to be comprised in one or more optional fields present in the channel bonding request frame.

Example 38 is the apparatus of Example 37, the channel bonding request frame to contain a bitmap including one or more bits set to indicate the presence of the one or more optional fields comprising the first channel information.

Example 39 is the apparatus of Example 38, the bitmap to comprise an 8-bit bitmap.

Example

Example 40 is the apparatus of any of Examples 28 to 39, the second channel information to be comprised in one or more optional fields present in the channel bonding response frame.

Example 41 is the apparatus of Example 40, the channel bonding response frame to contain a bitmap including one or more bits set to indicate the presence of the one or more optional fields comprising the second channel information.

Example 42 is the apparatus of Example 41, the bitmap to comprise an 8-bit bitmap.

Example 43 is the apparatus of any of Examples 28 to 42, the channel bonding request frame to comprise one or more link measurements.

Example 44 is the apparatus of Example 43, the one or more link measurements to be comprised in one or more optional fields present in the channel bonding request frame.

Example 45 is the apparatus of any of Examples 28 to 44, the channel bonding request frame to comprise one or more association identifiers (AIDs) associated with destination stations (STAs) of a multi-user multiple-input multiple-output (MU-MIMO) transmission.

Example 46 is the apparatus of Example 45, the one or more AIDs to be comprised in one or more optional fields present in the channel bonding request frame.

Example 47 is the apparatus of any of Examples 28 to 46, the channel bonding response frame to comprise one or more link measurements.

Example 48 is the apparatus of Example 47, the one or more link measurements to be comprised in one or more optional fields present in the channel bonding response frame.

Example 49 is the apparatus of any of Examples 28 to 48, the plurality of wireless channels to comprise wireless channels of a 60 GHz frequency band.

Example 50 is the apparatus of any of Examples 28 to 49, the logic to cause the wireless communication device to operate as an enhanced directional multi-gigabit (EDMG) station (STA).

Example 51 is the apparatus of Example 50, the logic to cause the wireless communication device to operate as a personal basic service set (PBSS) control point (PCP) or access point (AP), the remote device to comprise a non-PCP/AP EDMG STA.

Example 52 is the apparatus of Example 50, the remote device to comprise a personal basic service set (PBSS) control point (PCP) or access point (AP), the logic to cause the wireless communication device to operate as a non-PCP/AP EDMG STA.

Example 53 is a system, comprising an apparatus according to any of Examples 28 to 52, and at least one radio frequency (RF) transceiver.

Example 54 is the system of Example 53, comprising at least one processor.

Example 55 is the system of any of Examples 53 to 54, comprising at least one RF antenna.

Example 56 is at least one non-transitory computer-readable medium comprising a set of instructions that, in response to being executed at a wireless communication device, cause the wireless communication device to generate a channel bonding request frame for transmission to a remote device, the channel bonding request frame to comprise first channel information indicating a plurality of locally-clear wireless channels, identify, based on second channel information comprised in a received channel bonding response frame, a bonded channel set comprising two or more of the plurality of locally-clear wireless channels, and generate a data frame for transmission to the remote device via a combined bandwidth of the bonded channel set.

Example 57 is the at least one non-transitory computer-readable medium of Example 56, comprising instructions that, in response to being executed at the wireless communication device, cause the wireless communication device to identify the plurality of locally-clear wireless channels using a clear channel assessment (CCA) procedure.

Example 58 is the at least one non-transitory computer-readable medium of any of Examples 56 to 57, comprising instructions that, in response to being executed at the wireless communication device, cause the wireless communication device to generate a request-to-send (RTS) frame for transmission over each wireless channel of the bonded channel set prior to an initiation of a transmission of the data frame.

Example 59 is the at least one non-transitory computer-readable medium of any of Examples 56 to 58, comprising instructions that, in response to being executed at the wireless communication device, cause the wireless communication device to initiate a transmission of the data frame following a receipt of a clear-to-send (CTS) frame from the remote device.

Example 60 is the at least one non-transitory computer-readable medium of Example 59, the CTS frame to comprise a directional multi-gigabit (DMG) CTS frame.

Example 61 is the at least one non-transitory computer-readable medium of any of Examples 56 to 60, the channel bonding request and channel bonding response frames to comprise medium access control (MAC) Control frames.

Example 62 is the at least one non-transitory computer-readable medium of Example 61, the channel bonding request and channel bonding response frames to comprise MAC Control frames of a Control Frame Extension subtype.

Example 63 is the at least one non-transitory computer-readable medium of any of Examples 56 to 62, the first channel information to be comprised in one or more optional fields present in the channel bonding request frame.

Example 64 is the at least one non-transitory computer-readable medium of Example 63, the channel bonding request frame to contain a bitmap including one or more bits set to indicate the presence of the one or more optional fields comprising the first channel information.

Example 65 is the at least one non-transitory computer-readable medium of Example 64, the bitmap to comprise an 8-bit bitmap.

Example 66 is the at least one non-transitory computer-readable medium of any of Examples 56 to 65, the second channel information to be comprised in one or more optional fields present in the channel bonding response frame.

Example 67 is the at least one non-transitory computer-readable medium of Example 66, the channel bonding response frame to contain a bitmap including one or more bits set to indicate the presence of the one or more optional fields comprising the second channel information.

Example 68 is the at least one non-transitory computer-readable medium of Example 67, the bitmap to comprise an 8-bit bitmap.

Example 69 is the at least one non-transitory computer-readable medium of any of Examples 56 to 68, the channel bonding request frame to include a Duration field comprising a value selected to maintain an availability of each of the plurality of locally-clear wireless channels during a transmission of the channel bonding response frame.

Example 70 is the at least one non-transitory computer-readable medium of any of Examples 56 to 69, the channel bonding request frame to comprise one or more link measurements.

Example 71 is the at least one non-transitory computer-readable medium of Example 70, the one or more link measurements to be comprised in one or more optional fields present in the channel bonding request frame.

Example 72 is the at least one non-transitory computer-readable medium of any of Examples 56 to 71, the channel bonding request frame to comprise one or more association identifiers (AIDs) associated with destination stations (STAs) of a multi-user multiple-input multiple-output (MU-MIMO) transmission.

Example 73 is the at least one non-transitory computer-readable medium of Example 72, the one or more AIDs to be comprised in one or more optional fields present in the channel bonding request frame.

Example 74 is the at least one non-transitory computer-readable medium of any of Examples 56 to 73, the channel bonding response frame to comprise one or more link measurements.

Example 75 is the at least one non-transitory computer-readable medium of Example 74, the one or more link measurements to be comprised in one or more optional fields present in the channel bonding response frame.

Example 76 is the at least one non-transitory computer-readable medium of any of Examples 56 to 75, the plurality of locally-clear wireless channels to comprise wireless channels of a 60 GHz frequency band.

Example 77 is the at least one non-transitory computer-readable medium of any of Examples 56 to 76, comprising instructions that, in response to being executed at the wireless communication device, cause the wireless communication device to operate as an enhanced directional multi-gigabit (EDMG) station (STA).

Example 78 is the at least one non-transitory computer-readable medium of Example 77, comprising instructions that, in response to being executed at the wireless communication device, cause the wireless communication device to operate as a personal basic service set (PBSS) control point (PCP) or access point (AP), the remote device to comprise a non-PCP/AP EDMG STA.

Example 79 is the at least one non-transitory computer-readable medium of Example 77, the remote device to comprise a personal basic service set (PBSS) control point (PCP) or access point (AP), the wireless communication device to comprise a non-PCP/AP EDMG STA.

Example 80 is at least one non-transitory computer-readable medium comprising a set of instructions that, in response to being executed at a wireless communication device, cause the wireless communication device to identify a bonded channel set comprising two or more locally-clear wireless channels among a plurality of wireless channels indicated by first channel information comprised in a channel bonding request frame received from a remote device, generate a channel bonding response frame for transmission to the remote device, the channel bonding response frame to comprise second channel information indicating the two or more locally-clear wireless channels comprised in the bonded channel set, and decode a data frame received from the remote device via a combined bandwidth of the bonded channel set.

Example 81 is the at least one non-transitory computer-readable medium of Example 80, comprising instructions that, in response to being executed at the wireless communication device, cause the wireless communication device to identify the two or more locally-clear wireless channels using a clear channel assessment (CCA) procedure.

Example 82 is the at least one non-transitory computer-readable medium of any of Examples 80 to 81, comprising instructions that, in response to being executed at the wireless communication device, cause the wireless communication device to generate a clear-to-send (CTS) frame for transmission over each wireless channel of the bonded channel set prior to receipt of the data frame.

Example 83 is the at least one non-transitory computer-readable medium of Example 82, the CTS frame to include a Duration field comprising a value selected to maintain an availability of each wireless channel of the bonded channel set during a transmission of the data frame.

Example 84 is the at least one non-transitory computer-readable medium of any of Examples 82 to 83, comprising instructions that, in response to being executed at the wireless communication device, cause the wireless communication device to initiate transmission of the CTS frame over each wireless channel of the bonded channel set in response to a receipt of a request-to-send (RTS) frame from the remote device.

Example 85 is the at least one non-transitory computer-readable medium of Example 84, the channel bonding response frame to include a Duration field comprising a value selected to maintain an availability of each wireless channel of the bonded channel set during a transmission of the RTS frame.

Example 86 is the at least one non-transitory computer-readable medium of any of Examples 82 to 85, the CTS frame to comprise a directional multi-gigabit (DMG) CTS frame.

Example 87 is the at least one non-transitory computer-readable medium of any of Examples 80 to 86, the channel bonding request and channel bonding response frames to comprise medium access control (MAC) Control frames.

Example 88 is the at least one non-transitory computer-readable medium of Example 87, the channel bonding request and channel bonding response frames to comprise MAC Control frames of a Control Frame Extension subtype.

Example 89 is the at least one non-transitory computer-readable medium of any of Examples 80 to 88, the first channel information to be comprised in one or more optional fields present in the channel bonding request frame.

Example 90 is the at least one non-transitory computer-readable medium of Example 89, the channel bonding request frame to contain a bitmap including one or more bits set to indicate the presence of the one or more optional fields comprising the first channel information.

Example 91 is the at least one non-transitory computer-readable medium of Example 90, the bitmap to comprise an 8-bit bitmap.

Example 92 is the at least one non-transitory computer-readable medium of any of Examples 80 to 91, the second channel information to be comprised in one or more optional fields present in the channel bonding response frame.

Example 93 is the at least one non-transitory computer-readable medium of Example 92, the channel bonding response frame to contain a bitmap including one or more bits set to indicate the presence of the one or more optional fields comprising the second channel information.

Example 94 is the at least one non-transitory computer-readable medium of Example 93, the bitmap to comprise an 8-bit bitmap.

Example 95 is the at least one non-transitory computer-readable medium of any of Examples 80 to 94, the channel bonding request frame to comprise one or more link measurements.

Example 96 is the at least one non-transitory computer-readable medium of Example 95, the one or more link measurements to be comprised in one or more optional fields present in the channel bonding request frame.

Example 97 is the at least one non-transitory computer-readable medium of any of Examples 80 to 96, the channel bonding request frame to comprise one or more association identifiers (AIDs) associated with destination stations (STAs) of a multi-user multiple-input multiple-output (MU-MIMO) transmission.

Example 98 is the at least one non-transitory computer-readable medium of Example 97, the one or more AIDs to be comprised in one or more optional fields present in the channel bonding request frame.

Example 99 is the at least one non-transitory computer-readable medium of any of Examples 80 to 98, the channel bonding response frame to comprise one or more link measurements.

Example 100 is the at least one non-transitory computer-readable medium of Example 99, the one or more link measurements to be comprised in one or more optional fields present in the channel bonding response frame.

Example 101 is the at least one non-transitory computer-readable medium of any of Examples 80 to 100, the plurality of wireless channels to comprise wireless channels of a 60 GHz frequency band.

Example 102 is the at least one non-transitory computer-readable medium of any of Examples 80 to 101, comprising instructions that, in response to being executed at the wireless communication device, cause the wireless communication device to operate as an enhanced directional multi-gigabit (EDMG) station (STA).

Example 103 is the at least one non-transitory computer-readable medium of Example 102, comprising instructions that, in response to being executed at the wireless communication device, cause the wireless communication device to operate as a personal basic service set (PBSS) control point (PCP) or access point (AP), the remote device to comprise a non-PCP/AP EDMG STA.

Example 104 is the at least one non-transitory computer-readable medium of Example 102, the remote device to comprise a personal basic service set (PBSS) control point (PCP) or access point (AP), the wireless communication device to comprise a non-PCP/AP EDMG STA.

Example 105 is a method, comprising generating, by circuitry of a wireless communication device, a channel bonding request frame for transmission to a remote device, the channel bonding request frame to comprise first channel information indicating a plurality of locally-clear wireless channels, identifying, based on second channel information comprised in a received channel bonding response frame, a bonded channel set comprising two or more of the plurality of locally-clear wireless channels, and generating a data frame for transmission to the remote device via a combined bandwidth of the bonded channel set.

Example 106 is the method of Example 105, comprising identifying the plurality of locally-clear wireless channels using a clear channel assessment (CCA) procedure.

Example 107 is the method of any of Examples 105 to 106, comprising generating a request-to-send (RTS) frame for transmission over each wireless channel of the bonded channel set prior to an initiation of a transmission of the data frame.

Example 108 is the method of any of Examples 105 to 107, comprising initiating a transmission of the data frame following a receipt of a clear-to-send (CTS) frame from the remote device.

Example 109 is the method of Example 108, the CTS frame to comprise a directional multi-gigabit (DMG) CTS frame.

Example 110 is the method of any of Examples 105 to 109, the channel bonding request and channel bonding response frames to comprise medium access control (MAC) Control frames.

Example 111 is the method of Example 110, the channel bonding request and channel bonding response frames to comprise MAC Control frames of a Control Frame Extension subtype.

Example 112 is the method of any of Examples 105 to 111, the first channel information to be comprised in one or more optional fields present in the channel bonding request frame.

Example 113 is the method of Example 112, the channel bonding request frame to contain a bitmap including one or more bits set to indicate the presence of the one or more optional fields comprising the first channel information.

Example 114 is the method of Example 113, the bitmap to comprise an 8-bit bitmap.

Example 115 is the method of any of Examples 105 to 114, the second channel information to be comprised in one or more optional fields present in the channel bonding response frame.

Example 116 is the method of Example 115, the channel bonding response frame to contain a bitmap including one or more bits set to indicate the presence of the one or more optional fields comprising the second channel information.

Example 117 is the method of Example 116, the bitmap to comprise an 8-bit bitmap.

Example 118 is the method of any of Examples 105 to 117, the channel bonding request frame to include a Duration field comprising a value selected to maintain an availability of each of the plurality of locally-clear wireless channels during a transmission of the channel bonding response frame.

Example 119 is the method of any of Examples 105 to 118, the channel bonding request frame to comprise one or more link measurements.

Example 120 is the method of Example 119, the one or more link measurements to be comprised in one or more optional fields present in the channel bonding request frame.

Example 121 is the method of any of Examples 105 to 120, the channel bonding request frame to comprise one or more association identifiers (AIDs) associated with destination stations (STAs) of a multi-user multiple-input multiple-output (MU-MIMO) transmission.

Example 122 is the method of Example 121, the one or more AIDs to be comprised in one or more optional fields present in the channel bonding request frame.

Example 123 is the method of any of Examples 105 to 122, the channel bonding response frame to comprise one or more link measurements.

Example 124 is the method of Example 123, the one or more link measurements to be comprised in one or more optional fields present in the channel bonding response frame.

Example 125 is the method of any of Examples 105 to 124, the plurality of locally-clear wireless channels to comprise wireless channels of a 60 GHz frequency band.

Example 126 is the method of any of Examples 105 to 125, the wireless communication device to operate as an enhanced directional multi-gigabit (EDMG) station (STA).

Example 127 is the method of Example 126, the wireless communication device to operate as a personal basic service set (PBSS) control point (PCP) or access point (AP), the remote device to comprise a non-PCP/AP EDMG STA.

Example 128 is the method of Example 126, the remote device to comprise a personal basic service set (PBSS) control point (PCP) or access point (AP), the wireless communication device to operate as a non-PCP/AP EDMG STA.

Example 129 is at least one non-transitory computer-readable storage medium comprising a set of instructions that, in response to being executed on a computing device, cause the computing device to perform a method according to any of Examples 105 to 128.

Example 130 is an apparatus, comprising means for performing a method according to any of Examples 105 to 128.

Example 131 is a system, comprising the apparatus of Example 130, and at least one radio frequency (RF) transceiver.

Example 132 is the system of Example 131, comprising at least one processor.

Example 133 is the system of any of Examples 132 to 133, comprising at least one RF antenna.

Example 134 is a method, comprising identifying, by circuitry of a wireless communication device, a bonded channel set comprising two or more locally-clear wireless channels among a plurality of wireless channels indicated by first channel information comprised in a channel bonding request frame received from a remote device, generating a channel bonding response frame for transmission to the remote device, the channel bonding response frame to comprise second channel information indicating the two or more locally-clear wireless channels comprised in the bonded channel set, and decoding a data frame received from the remote device via a combined bandwidth of the bonded channel set.

Example 135 is the method of Example 134, comprising identifying the two or more locally-clear wireless channels using a clear channel assessment (CCA) procedure.

Example 136 is the method of any of Examples 134 to 135, comprising generating a clear-to-send (CTS) frame for transmission over each wireless channel of the bonded channel set prior to receipt of the data frame.

Example 137 is the method of Example 136, the CTS frame to include a Duration field comprising a value selected to maintain an availability of each wireless channel of the bonded channel set during a transmission of the data frame.

Example 138 is the method of any of Examples 136 to 137, comprising initiating transmission of the CTS frame over each wireless channel of the bonded channel set in response to a receipt of a request-to-send (RTS) frame from the remote device.

Example 139 is the method of Example 138, the channel bonding response frame to include a Duration field comprising a value selected to maintain an availability of each wireless channel of the bonded channel set during a transmission of the RTS frame.

Example 140 is the method of any of Examples 136 to 139, the CTS frame to comprise a directional multi-gigabit (DMG) CTS frame.

Example 141 is the method of any of Examples 134 to 140, the channel bonding request and channel bonding response frames to comprise medium access control (MAC) Control frames.

Example 142 is the method of Example 141, the channel bonding request and channel bonding response frames to comprise MAC Control frames of a Control Frame Extension subtype.

Example 143 is the method of any of Examples 134 to 142, the first channel information to be comprised in one or more optional fields present in the channel bonding request frame.

Example 144 is the method of Example 143, the channel bonding request frame to contain a bitmap including one or more bits set to indicate the presence of the one or more optional fields comprising the first channel information.

Example 145 is the method of Example 144, the bitmap to comprise an 8-bit bitmap.

Example 146 is the method of any of Examples 134 to 145, the second channel information to be comprised in one or more optional fields present in the channel bonding response frame.

Example 147 is the method of Example 146, the channel bonding response frame to contain a bitmap including one or more bits set to indicate the presence of the one or more optional fields comprising the second channel information.

Example 148 is the method of Example 147, the bitmap to comprise an 8-bit bitmap.

Example 149 is the method of any of Examples 134 to 148, the channel bonding request frame to comprise one or more link measurements.

Example 150 is the method of Example 149, the one or more link measurements to be comprised in one or more optional fields present in the channel bonding request frame.

Example 151 is the method of any of Examples 134 to 150, the channel bonding request frame to comprise one or more association identifiers (AIDs) associated with destination stations (STAs) of a multi-user multiple-input multiple-output (MU-MIMO) transmission.

Example 152 is the method of Example 151, the one or more AIDs to be comprised in one or more optional fields present in the channel bonding request frame.

Example 153 is the method of any of Examples 134 to 152, the channel bonding response frame to comprise one or more link measurements.

Example 154 is the method of Example 153, the one or more link measurements to be comprised in one or more optional fields present in the channel bonding response frame.

Example 155 is the method of any of Examples 134 to 154, the plurality of wireless channels to comprise wireless channels of a 60 GHz frequency band.

Example 156 is the method of any of Examples 134 to 155, the wireless communication device to operate as an enhanced directional multi-gigabit (EDMG) station (STA).

Example 157 is the method of Example 156, the wireless communication device to operate as a personal basic service set (PBSS) control point (PCP) or access point (AP), the remote device to comprise a non-PCP/AP EDMG STA.

Example 158 is the method of Example 156, the remote device to comprise a personal basic service set (PBSS) control point (PCP) or access point (AP), the wireless communication device to operate as a non-PCP/AP EDMG STA.

Example 159 is at least one non-transitory computer-readable storage medium comprising a set of instructions that, in response to being executed on a computing device, cause the computing device to perform a method according to any of Examples 134 to 158.

Example 160 is an apparatus, comprising means for performing a method according to any of Examples 134 to 158.

Example 161 is a system, comprising the apparatus of Example 160, and at least one radio frequency (RF) transceiver.

Example 162 is the system of Example 161, comprising at least one processor.

Example 163 is the system of any of Examples 161 to 162, comprising at least one RF antenna.

Example 164 is an apparatus, comprising means for generating a channel bonding request frame for transmission from a wireless communication device to a remote device, the channel bonding request frame to comprise first channel information indicating a plurality of locally-clear wireless channels, means for identifying, based on second channel information comprised in a received channel bonding response frame, a bonded channel set comprising two or more of the plurality of locally-clear wireless channels, and means for generating a data frame for transmission to the remote device via a combined bandwidth of the bonded channel set.

Example 165 is the apparatus of Example 164, comprising means for identifying the plurality of locally-clear wireless channels using a clear channel assessment (CCA) procedure.

Example 166 is the apparatus of any of Examples 164 to 165, comprising means for generating a request-to-send (RTS) frame for transmission over each wireless channel of the bonded channel set prior to an initiation of a transmission of the data frame.

Example 167 is the apparatus of any of Examples 164 to 166, comprising means for initiating a transmission of the data frame following a receipt of a clear-to-send (CTS) frame from the remote device.

Example 168 is the apparatus of Example 167, the CTS frame to comprise a directional multi-gigabit (DMG) CTS frame.

Example 169 is the apparatus of any of Examples 164 to 168, the channel bonding request and channel bonding response frames to comprise medium access control (MAC) Control frames.

Example 170 is the apparatus of Example 169, the channel bonding request and channel bonding response frames to comprise MAC Control frames of a Control Frame Extension subtype.

Example 171 is the apparatus of any of Examples 164 to 170, the first channel information to be comprised in one or more optional fields present in the channel bonding request frame.

Example 172 is the apparatus of Example 171, the channel bonding request frame to contain a bitmap including one or more bits set to indicate the presence of the one or more optional fields comprising the first channel information.

Example 173 is the apparatus of Example 172, the bitmap to comprise an 8-bit bitmap.

Example 174 is the apparatus of any of Examples 164 to 173, the second channel information to be comprised in one or more optional fields present in the channel bonding response frame.

Example 175 is the apparatus of Example 174, the channel bonding response frame to contain a bitmap including one or more bits set to indicate the presence of the one or more optional fields comprising the second channel information.

Example 176 is the apparatus of Example 175, the bitmap to comprise an 8-bit bitmap.

Example 177 is the apparatus of any of Examples 164 to 176, the channel bonding request frame to include a Duration field comprising a value selected to maintain an availability of each of the plurality of locally-clear wireless channels during a transmission of the channel bonding response frame.

Example 178 is the apparatus of any of Examples 164 to 177, the channel bonding request frame to comprise one or more link measurements.

Example 179 is the apparatus of Example 178, the one or more link measurements to be comprised in one or more optional fields present in the channel bonding request frame.

Example 180 is the apparatus of any of Examples 164 to 179, the channel bonding request frame to comprise one or more association identifiers (AIDs) associated with destination stations (STAs) of a multi-user multiple-input multiple-output (MU-MIMO) transmission.

Example 181 is the apparatus of Example 180, the one or more AIDs to be comprised in one or more optional fields present in the channel bonding request frame.

Example 182 is the apparatus of any of Examples 164 to 181, the channel bonding response frame to comprise one or more link measurements.

Example 183 is the apparatus of Example 182, the one or more link measurements to be comprised in one or more optional fields present in the channel bonding response frame.

Example 184 is the apparatus of any of Examples 164 to 183, the plurality of locally-clear wireless channels to comprise wireless channels of a 60 GHz frequency band.

Example 185 is the apparatus of any of Examples 164 to 184, the wireless communication device to comprise an enhanced directional multi-gigabit (EDMG) station (STA).

Example 186 is the apparatus of Example 185, the wireless communication device to comprise a personal basic service set (PBSS) control point (PCP) or access point (AP), the remote device to comprise a non-PCP/AP EDMG STA.

Example 187 is the apparatus of Example 185, the remote device to comprise a personal basic service set (PBSS) control point (PCP) or access point (AP), the wireless communication device to comprise a non-PCP/AP EDMG STA.

Example 188 is a system, comprising an apparatus according to any of Examples 164 to 187, and at least one radio frequency (RF) transceiver.

Example 189 is the system of Example 188, comprising at least one processor.

Example 190 is the system of any of Examples 188 to 189, comprising at least one RF antenna.

Example 191 is an apparatus, comprising means for identifying, at a wireless communication device, a bonded channel set comprising two or more locally-clear wireless channels among a plurality of wireless channels indicated by first channel information comprised in a channel bonding request frame received from a remote device, means for generating a channel bonding response frame for transmission to the remote device, the channel bonding response frame to comprise second channel information indicating the two or more locally-clear wireless channels comprised in the bonded channel set, and means for decoding a data frame received from the remote device via a combined bandwidth of the bonded channel set.

Example 192 is the apparatus of Example 191, comprising means for identifying the two or more locally-clear wireless channels using a clear channel assessment (CCA) procedure.

Example 193 is the apparatus of any of Examples 191 to 192, comprising means for generating a clear-to-send (CTS) frame for transmission over each wireless channel of the bonded channel set prior to receipt of the data frame.

Example 194 is the apparatus of Example 193, the CTS frame to include a Duration field comprising a value selected to maintain an availability of each wireless channel of the bonded channel set during a transmission of the data frame.

Example 195 is the apparatus of any of Examples 193 to 194, comprising means for initiating transmission of the CTS frame over each wireless channel of the bonded channel set in response to a receipt of a request-to-send (RTS) frame from the remote device.

Example 196 is the apparatus of Example 195, the channel bonding response frame to include a Duration field comprising a value selected to maintain an availability of each wireless channel of the bonded channel set during a transmission of the RTS frame.

Example 197 is the apparatus of any of Examples 193 to 196, the CTS frame to comprise a directional multi-gigabit (DMG) CTS frame.

Example 198 is the apparatus of any of Examples 191 to 197, the channel bonding request and channel bonding response frames to comprise medium access control (MAC) Control frames.

Example 199 is the apparatus of Example 198, the channel bonding request and channel bonding response frames to comprise MAC Control frames of a Control Frame Extension subtype.

Example 200 is the apparatus of any of Examples 191 to 199, the first channel information to be comprised in one or more optional fields present in the channel bonding request frame.

Example 201 is the apparatus of Example 200, the channel bonding request frame to contain a bitmap including one or more bits set to indicate the presence of the one or more optional fields comprising the first channel information.

Example 202 is the apparatus of Example 201, the bitmap to comprise an 8-bit bitmap.

Example 203 is the apparatus of any of Examples 191 to 202, the second channel information to be comprised in one or more optional fields present in the channel bonding response frame.

Example 204 is the apparatus of Example 203, the channel bonding response frame to contain a bitmap including one or more bits set to indicate the presence of the one or more optional fields comprising the second channel information.

Example 205 is the apparatus of Example 204, the bitmap to comprise an 8-bit bitmap.

Example 206 is the apparatus of any of Examples 191 to 205, the channel bonding request frame to comprise one or more link measurements.

Example 207 is the apparatus of Example 206, the one or more link measurements to be comprised in one or more optional fields present in the channel bonding request frame.

Example 208 is the apparatus of any of Examples 191 to 207, the channel bonding request frame to comprise one or more association identifiers (AIDs) associated with destination stations (STAs) of a multi-user multiple-input multiple-output (MU-MIMO) transmission.

Example 209 is the apparatus of Example 208, the one or more AIDs to be comprised in one or more optional fields present in the channel bonding request frame.

Example 210 is the apparatus of any of Examples 191 to 209, the channel bonding response frame to comprise one or more link measurements.

Example 211 is the apparatus of Example 210, the one or more link measurements to be comprised in one or more optional fields present in the channel bonding response frame.

Example 212 is the apparatus of any of Examples 191 to 211, the plurality of wireless channels to comprise wireless channels of a 60 GHz frequency band.

Example 213 is the apparatus of any of Examples 191 to 212, the wireless communication device to comprise an enhanced directional multi-gigabit (EDMG) station (STA).

Example 214 is the apparatus of Example 213, the wireless communication device to comprise a personal basic service set (PBSS) control point (PCP) or access point (AP), the remote device to comprise a non-PCP/AP EDMG STA.

Example 215 is the apparatus of Example 213, the remote device to comprise a personal basic service set (PBSS) control point (PCP) or access point (AP), the wireless communication device to comprise a non-PCP/AP EDMG STA.

Example 216 is a system, comprising an apparatus according to any of Examples 191 to 215, and at least one radio frequency (RF) transceiver.

Example 217 is the system of Example 216, comprising at least one processor.

Example 218 is the system of any of Examples 216 to 217, comprising at least one RF antenna.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    a memory; and
    logic for a wireless communication device, at least a portion of the logic implemented in circuitry coupled to the memory, the logic to:
        generate a channel bonding request frame for transmission to a remote device, the channel bonding request frame to comprise first channel information indicating a plurality of locally-clear wireless channels, wherein the channel bonding request frame is a ready-to-send (RTS) frame;
        identify, based on second channel information comprised in a received channel bonding response frame, a bonded channel set comprising two or more of the plurality of locally-clear wireless channels; and
        generate a data frame for transmission to the remote device via a combined bandwidth of the bonded channel set.

2. The apparatus of claim 1, the logic to identify the plurality of locally-clear wireless channels using a clear channel assessment (CCA) procedure.

3. The apparatus of claim 1, the channel bonding request and channel bonding response frames to comprise medium access control (MAC) Control frames of a Control Frame Extension subtype.

4. The apparatus of claim 1, the first channel information to be comprised in one or more optional fields present in the channel bonding request frame.

5. The apparatus of claim 4, the channel bonding request frame to contain a bitmap including one or more bits set to indicate presence of the one or more optional fields comprising the first channel information.

6. The apparatus of claim 1, the channel bonding request frame to include a Duration field comprising a value selected to maintain an availability of each of the plurality of locally-clear wireless channels during a transmission of the channel bonding response frame.

7. The apparatus of claim 1, the channel bonding request frame to comprise one or more link measurements.

8. The apparatus of claim 1, the plurality of locally-clear wireless channels to comprise wireless channels of a 60 GHz frequency band.

9. A system, comprising:
    the apparatus of claim 1;
    at least one radio frequency (RF) transceiver; and
    at least one RF antenna.

10. An apparatus, comprising:
a memory; and
logic for a wireless communication device, at least a portion of the logic implemented in circuitry coupled to the memory, the logic to:
identify a bonded channel set comprising two or more locally-clear wireless channels among a plurality of wireless channels indicated by first channel information comprised in a channel bonding request frame received from a remote device, wherein the channel bonding request frame is a ready-to-send (RTS) frame;
generate a channel bonding response frame for transmission to the remote device, the channel bonding response frame to comprise second channel information indicating the two or more locally-clear wireless channels comprised in the bonded channel set; and
decode a data frame received from the remote device via a combined bandwidth of the bonded channel set.

11. The apparatus of claim 10, the logic to generate a directional multi-gigabit (DMG) clear-to-send (CTS) frame for transmission over each wireless channel of the bonded channel set prior to receipt of the data frame, the DMG CTS frame to include a Duration field comprising a value selected to maintain an availability of each wireless channel of the bonded channel set during a transmission of the data frame.

12. The apparatus of claim 11, the logic to initiate transmission of the DMG CTS frame over each wireless channel of the bonded channel set in response to a receipt of a request-to-send (RTS) frame from the remote device, the channel bonding response frame to include a Duration field comprising a value selected to maintain an availability of each wireless channel of the bonded channel set during a transmission of the RTS frame.

13. The apparatus of claim 10, the channel bonding request and channel bonding response frames to comprise medium access control (MAC) Control frames of a Control Frame Extension subtype.

14. The apparatus of claim 10, the second channel information to be comprised in one or more optional fields present in the channel bonding response frame.

15. The apparatus of claim 14, the channel bonding response frame to contain a bitmap including one or more bits set to indicate presence of the one or more optional fields comprising the second channel information.

16. The apparatus of claim 10, the channel bonding response frame to comprise one or more link measurements.

17. The apparatus of claim 10, the plurality of wireless channels to comprise wireless channels of a 60 GHz frequency band.

18. At least one non-transitory computer-readable medium comprising a set of instructions that, in response to being executed at a wireless communication device, cause the wireless communication device to:
generate a channel bonding request frame for transmission to a remote device, the channel bonding request frame to comprise first channel information indicating a plurality of locally-clear wireless channels, wherein the channel bonding request frame is a ready-to-send (RTS) frame;
identify, based on second channel information comprised in a received channel bonding response frame, a bonded channel set comprising two or more of the plurality of locally-clear wireless channels; and
generate a data frame for transmission to the remote device via a combined bandwidth of the bonded channel set.

19. The at least one non-transitory computer-readable medium of claim 18, the channel bonding request and channel bonding response frames to comprise medium access control (MAC) Control frames of a Control Frame Extension subtype.

20. The at least one non-transitory computer-readable medium of claim 18, the first channel information to be comprised in one or more optional fields present in the channel bonding request frame.

21. The at least one non-transitory computer-readable medium of claim 18, the channel bonding request frame to include a Duration field comprising a value selected to maintain an availability of each of the plurality of locally-clear wireless channels during a transmission of the channel bonding response frame.

22. At least one non-transitory computer-readable medium comprising a set of instructions that, in response to being executed at a wireless communication device, cause the wireless communication device to:
identify a bonded channel set comprising two or more locally-clear wireless channels among a plurality of wireless channels indicated by first channel information comprised in a channel bonding request frame received from a remote device, wherein the channel bonding request frame is a ready-to-send (RTS) frame;
generate a channel bonding response frame for transmission to the remote device, the channel bonding response frame to comprise second channel information indicating the two or more locally-clear wireless channels comprised in the bonded channel set; and
decode a data frame received from the remote device via a combined bandwidth of the bonded channel set.

23. The at least one non-transitory computer-readable medium of claim 22, comprising instructions that, in response to being executed at the wireless communication device, cause the wireless communication device to generate a directional multi-gigabit (DMG) clear-to-send (CTS) frame for transmission over each wireless channel of the bonded channel set prior to receipt of the data frame, the DMG CTS frame to include a Duration field comprising a value selected to maintain an availability of each wireless channel of the bonded channel set during a transmission of the data frame.

24. The at least one non-transitory computer-readable medium of claim 23, comprising instructions that, in response to being executed at the wireless communication device, cause the wireless communication device to initiate transmission of the DMG CTS frame over each wireless channel of the bonded channel set in response to a receipt of a request-to-send (RTS) frame from the remote device, the channel bonding response frame to include a Duration field comprising a value selected to maintain an availability of each wireless channel of the bonded channel set during a transmission of the RTS frame.

25. The at least one non-transitory computer-readable medium of claim 22, the channel bonding request and channel bonding response frames to comprise medium access control (MAC) Control frames of a Control Frame Extension subtype.

* * * * *